Feb. 27, 1962     M. R. PIERCE     3,022,703
OPTICAL NAVIGATIONAL DEVICE

Filed Jan. 17, 1956     5 Sheets-Sheet 1

MAURICE R. PIERCE,
INVENTOR.

BY

ATTORNEY.

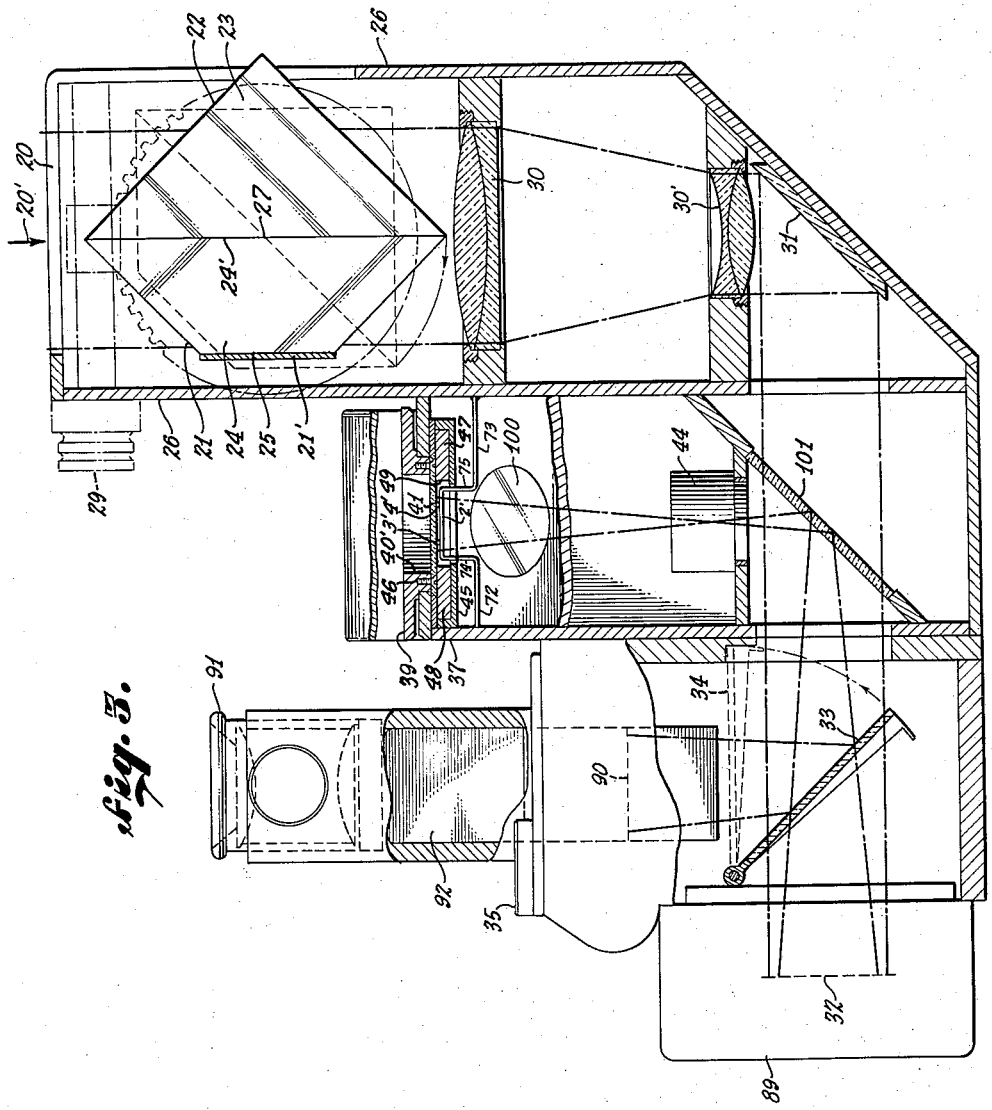

Feb. 27, 1962 M. R. PIERCE 3,022,703
OPTICAL NAVIGATIONAL DEVICE
Filed Jan. 17, 1956 5 Sheets-Sheet 3

MAURICE R. PIERCE,
INVENTOR.

BY
ATTORNEY.

Feb. 27, 1962 M. R. PIERCE 3,022,703
OPTICAL NAVIGATIONAL DEVICE
Filed Jan. 17, 1956 5 Sheets-Sheet 4
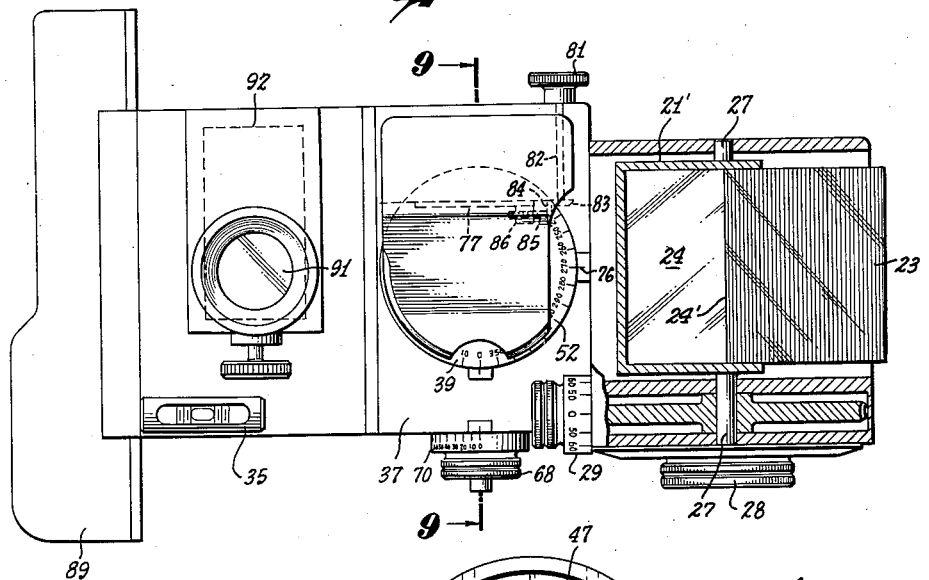
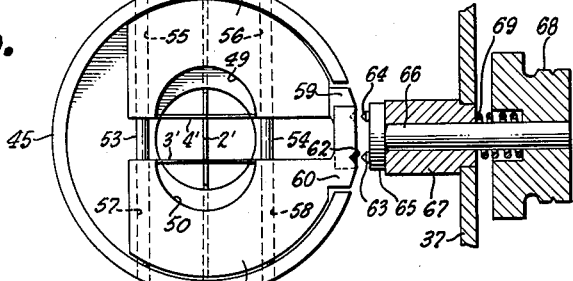
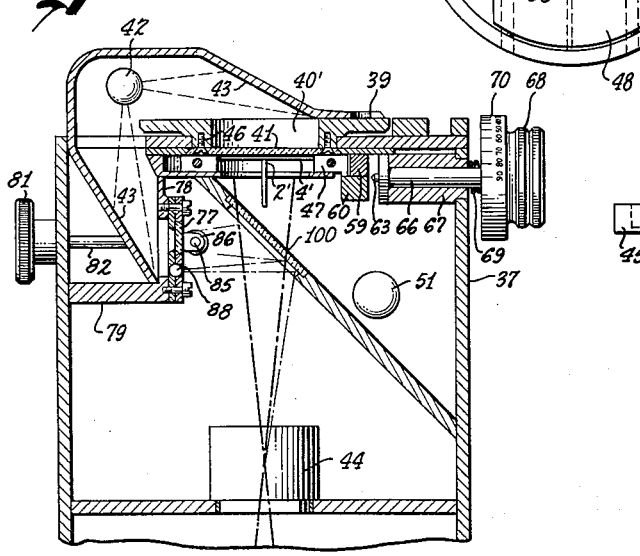
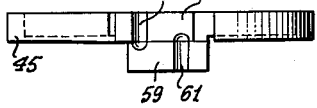
MAURICE R. PIERCE,
INVENTOR.
BY
*Gerald H. Peterson*
ATTORNEY.

Feb. 27, 1962     M. R. PIERCE     3,022,703
OPTICAL NAVIGATIONAL DEVICE
Filed Jan. 17, 1956     5 Sheets-Sheet 5

MAURICE R. PIERCE,
INVENTOR.

BY

ATTORNEY.

United States Patent Office 3,022,703
Patented Feb. 27, 1962

3,022,703
OPTICAL NAVIGATIONAL DEVICE
Maurice R. Pierce, 2237 Panorama Terrace,
Los Angeles, Calif.
Filed Jan. 17, 1956, Ser. No. 559,678
5 Claims. (Cl. 88—2.7)

This invention relates to an optical device or camera useful in celestial navigation providing a composite image or photograph of the line of position corresponding to observation made on a celestial body and including an image of said body, azimuth line of direction to the celestial body, and lines of longitude corresponding to the latitude, all as plotted on a universal plotting sheet.

As well known in celestial navigation, a line of position along with the customary longitude lines and azimuth line is plotted on a universal plotting sheet such as published at the Hydrographic Office and such as shown, for example, on page 28 of "Marine Navigation" by P. V. H. Weems, published by D. Van Nostrand Company, 1940. The plotting of a line of position is well-known in celestial navigation as is explained, for example, on pages 270–272 of said publication by Weems.

Such a universal plotting sheet has printed thereon an azimuth circle graduated in degrees with the 0° marking at the top and having a radius corresponding to one degree of latitude, one central longitude line passing through the center of the azimuth circle and the 0° and 180° markings, a central latitude line perpendicular to the longitude line and passing through the center of the azimuth circle and the 90° and 270° markings, two more latitude lines parallel to the first and contacting opposite outer edges of the circle at the 0° and 180° markings, respectively. The longitude line is graduated in minutes of a degree.

In plotting line of position, the assumed position is taken as the center of the azimuth circle on the chart. Longitude lines are drawn on the chart by hand on each side of the one central longitude line, representing one degree more and one degree less than the central longitude line, at a distance therefrom depending on the latitude of the assumed position. The azimuth line for the particular celestial body with respect to which the line of position is to be obtained is drawn on the chart by hand through (1) the center of the circle and (2) the azimuth-angle-marking on the azimuth circle corresponding to the azimuth angle of the celestial body from the assumed position. The altitude of the celestial body is then observed, and the difference between the observed altitude and the altitude computed for the assumed position is marked off on the azimuth line the proper direction from the center of the circle and a line drawn at this marked point perpendicular to the azimuth line. This line is the "line of position" with respect to this particular celestial body.

It is desirable in celestial navigation to obtain such a plot as quickly as possible from the observation of the celestial body. It is an especially important advantage of my invention that, not only is such a plot obtained quickly by the use of my invention in conjunction with the altitude and azimuth precomputed with respect to the assumed position, but the image of the celestial body is included in the composite image in a manner in accordance with the invention providing directly the point in the composite image locating the line of position without having to observe the altitude and plot this point from a calculation of the difference between such observed altitude and the altitude computed from the assumed position. Of course, this image of the celestial body within the composite image also provides the necessary data from which the observed altitude can be obtained, if desired.

In accordance with my invention I have devised an optical device or camera which will provide a composite optical image, which can be either viewed by means of an eye-piece or photographed with a camera arrangement, of the desired components of such a plotted chart showing the image of the celestial body, azimuth line, line of position, the azimuth circle, latitude and longitude lines, which device is adapted to be used in the manner of a sextant so that, when it, as a sextant, is levelled and directed at the celestial body in accordance with the azimuth and altitude of the assumed position, a composite optical image of the azimuth circle, latitude and longitude lines, azimuth line, and celestial body is produced as plotted on a chart. My device is also provided with a means for introducing into this composite image a movable image of a line of position perpendicular to the azimuth line which can be made to coincide with the image of the celestial body, and, when so adjusted, a composite image is obtained corresponding to the line of position as plotted on such a chart. This composite image may be viewed with an eyepiece as the image of the line of position is adjusted to coincide with the image of the celestial body. Means are also provided for photographing this composite image to provide a photographic record of the composite image. Such a photograph provides all such information as usually appears for a plot of a line of position on a universal plotting sheet in one composite photograph.

Accordingly, it is an object of my invention to provide such an optical device which will quickly give a composite image of the necessary information for such a line of position.

It is another object of my invention to provide a camera which will give a photograph of such a composite image.

It is still further object of my invention to provide a device which will readily provide such a visual image or such a photograph.

It is still another object of my invention to provide such a device which will give such a composite image, or photograph, with an image of the celestial body included in the composite.

Other and further important objects and advantages of my invention will be apparent to those skilled in the art.

In accordance with one broad aspect and embodiment of the invention there is provided an arrangement for providing a composite image consisting of an image of the basic essential reference markings for an assumed point of position and an image of a celestial body such that a line of position with respect to this celestial body is available, as understood in celestial navigation, by providing a line through the image of the celestial body perpendicular to the azimuth line of direction.

This basic combination of the invention will suitably include other additional modifying features as pointed out below as desired. These include means for introducing into the composite image an image of such basic reference markings for the assumed position as are provided on the universal plotting sheet as published by the Hydrographic Office, means for introducing an image of the azimuth line into the composite image, and preferably also means for introducing an image of the two longitude lines on each side of the longitude line passing through the assumed position. Preferably, also, there will be means for introducing a movable image of a line of position intersecting and perpendicular to the azimuth line and adjustable to move along, and perpendicularly to, the azimuth line so that it can be moved to pass through the image of the celestial body while maintaining its direction as perpendicular to the azimuth line of direction.

In accordance with the one comprehensive embodiment of my invention generally described, it consists of a combination of optical means for providing a composite image, as referred to above, with a first optical means introducing into the composite image (1) the basic reference markings corresponding to an assumed position for plotting a line of position, such as appears on a universal plotting sheet published by the Hydrographic Office, rotatable in the plane of the image about the center of the azimuth circle in accordance with azimuth adjustment, (2) an image of two longitude lines on each side of the central longitude line adjustable in spacing therefrom in accordance with the latitude of the assumed position, (3) an image of the azimuth line representing the azimuthal line of direction to the celestial body passing through the center of the azimuth circle, and (4) an image of the line of position perpendicular to the azimuth line and adjustable along the azimuth line while perpendicular thereto so that it can be moved to coincide with the image of the celestial body appearing on the azimuth line; and second optical means introducing into the composite image an image of the celestial body, capable of being set accurately at the assumed altitude, and so related to said first optical means that, when the observed altitude of the celestial body is identical with the assumed altitude, the image of the celestial body appears at the center of the azimuth circle, and the image produced by said second optical means having a scale corresponding with the azimuth circle such that, when the image of the celestial body is on the circle, the observed altitude is one degree (60 minutes) from the assumed position.

My invention will be described and illustrated by reference to the specific embodiment thereof shown in the accompanying drawings in which:

FIGURE 3 is elevational view in cross section of the device of my invention showing particularly the relationship of the various optical components.

FIGURE 4 shows a negative photographic image which is the optical source of the essential elements of the basic reference markings for an assumed position as found on a universal plotting chart, with the details of the graduations and degree markings omitted, it being understood that the negative image used may include these details obtained as a photographic image of a universal plotting chart.

FIGURE 8 is a plan view of my device showing the front portion in section. FIGURE 9 is a section of a portion of the device on the line 9—9 of FIG. 8.

FIGURE 10 is a detail view of the arrangement for adjusting the elements which are the sources of the images of the adjustable longitude lines. FIGURE 11 shows a further detail of the arrangement of FIG. 10 on the lines 11—11 of FIG. 10.

FIGURE 12 is a schematic view in perspective showing the relationship of the optical parts with the sources of azimuth circle, adjustable longitude lines, and azimuth line shown separated for clearer illustration.

Figure 1:
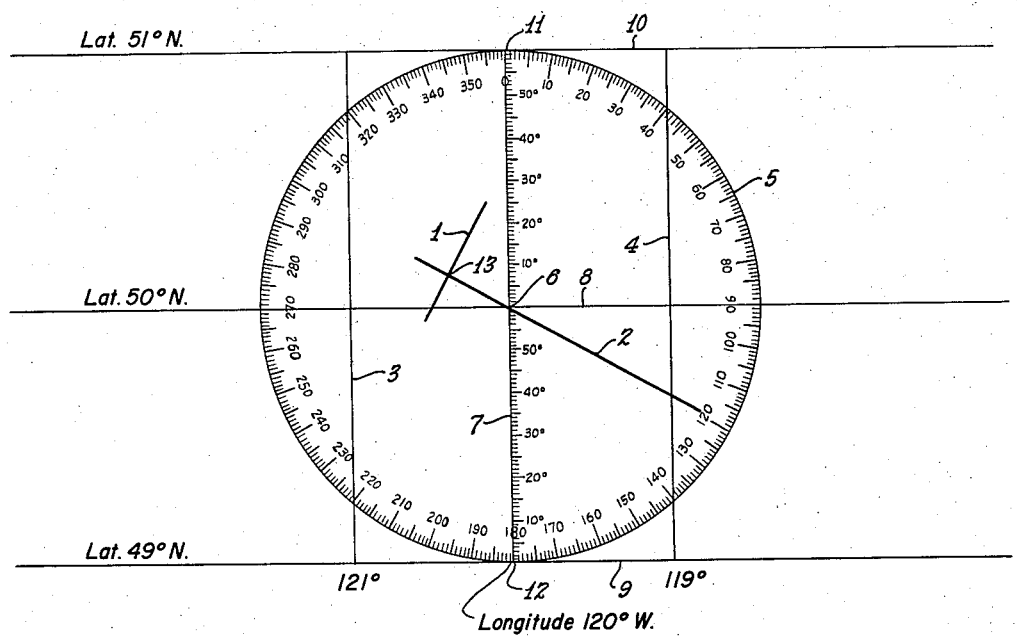
FIGURE 1 illustrates a typical plot, forming no part of the invention, of a line of position, azimuth line, and longitude lines on a universal plotting chart.

In explaining my invention reference will first be made to a line of position as customarily plotted on a universal plotting sheet as shown in FIG. 1. Here is shown a line of position 1, azimuth line 2, longitude lines 3 and 4 drawn on a chart having graduated azimuth circle 5, with center 6, longitude line 7 and latitude line 8 intersecting at the center 6 of the circle, and further latitude lines 9 and 10 tangent to the outer edge of the circle where longitude line 7 intersects the circle at points 11 and 12. For illustration the assumed position is taken as latitude 50° N and longitude 120°. Also for the purpose of illustration, the computed azimuth for the star 37, Arcturus, is taken as 119° and the computed altitude 45° 59′ for the assumed position of latitude 50° N and longitude 120°. The observed altitude is taken as 45° 44′, which is 15′ less than the computed altitude based on the assumed position. This means that the observer is farther away from the star than the assumed position along the azimuth line, and therefore point 13 is plotted 15′ from the center 6 of the azimuth circle in a direction opposite to that of the celestial body along the azimuth line. Through point 13 line 1 is drawn perpendicular to the azimuth line 2. This is the line of position.

As pointed out generally above, the optical device of my invention provides a composite image of the azimuth circle as shown at 5 with its center 6, latitude lines 8, 9 and 10, longitude line 7, including adjustable longitude lines 3 and 4, azimuth line 2, an image of the celestial body at 13, and line of position as shown at 1.

As shown in FIG. 3, my device consists of a unitary structure having a first optical arrangement for providing in the composite image the image of the azimuth circle, the longitude and latitude lines, the azimuth line, and line of position; a second arrangement for providing to the composite image the image of the celestial body, capable of adjustment for the computed altitude and so related to the first arrangement that the image of the celestial body in the composite image is at the center of the azimuth circle when the observed altitude and computed altitude are identical, and the image it produces in the composite image having a scale corresponding to the image of the azimuth circle such that, when the image of the celestial body is on the azimuth circle the observed altitude is 60 minutes different from the altitude corresponding to the center of the azimuth circle; and a third optical arrangement for either viewing or making a photograph of the composite image.

Figure 6:
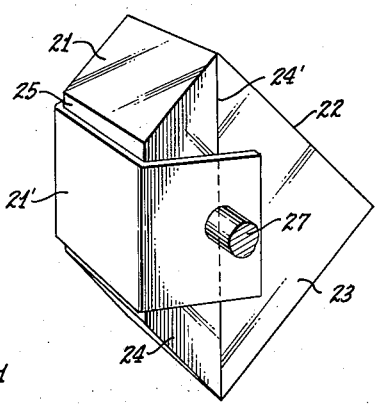
FIGURE 6 is a perspective view of the double-Dove prism used as the inlet aperture of the optical device for obtaining the image of the celestial body adjustable in accordance with its altitude.
Figure 7:
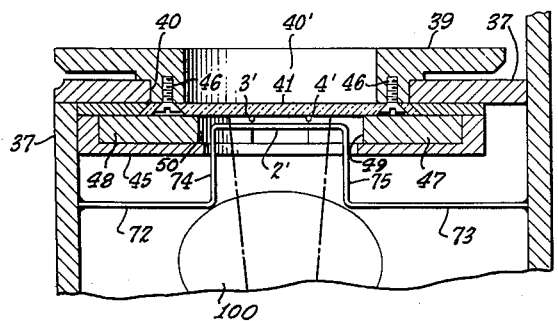
FIGURE 7 is a cross-sectional view of that portion of my device carrying the sources for the images of the azimuth circle, longitude lines, and azimuth line.
Figure 42:
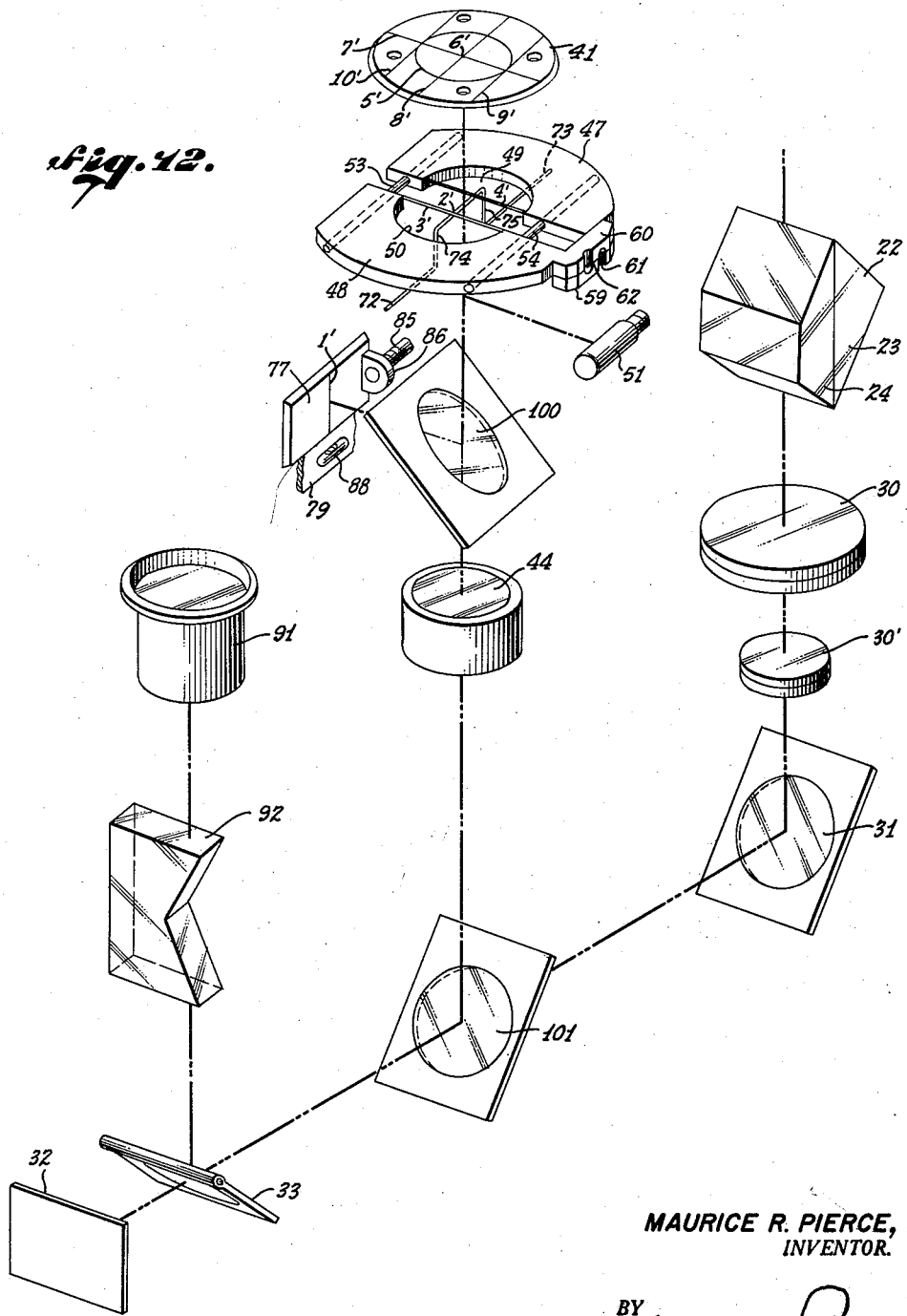

Referring to FIGS. 3 and 12, light rays 20′ from the celestial body, such as a star, enter opening 20 and impinge on the inlet faces 21 and 22 of the double-Dove reversion prism consisting of one Dove prism 23 and another Dove prism 24, cemented together along the reflection coated face 24′. The apex of prism 24 is removed as at 25 for mounting and for rotation within the housing 26. This double-Dove reversion prism is mounted in a bracket 21′ as shown in FIG. 6 and is adapted to rotate about axis 27. It is set in accordance with the computed altitude by altitude coarse-setting means 28 having fine-setting device 29 as understood in the art such as illustrated in FIG. 153, page 294 of said publication by Weems, for example. With this arrangement any altitude setting may be made between zero and 90 degrees with the fine setting as provided by element 29 graduated in minutes. It will be understood by those skilled in the art that the single Dove prism 23 would be sufficient but that the addition of the other Dove prism 24 increases the amount of light entering the optical device from the celestial body. Such a double-Dove prism is known in the art and is described, for example, in "Fundamentals of Optical Engineering," by D. H. Jacobs, published 1943 by McGraw-Hill Book Company, New York, page 159.

Below this set of prisms is telephoto lens system consisting of lenses 30 and 30′ which, with 45-degree mirror 31, provides through approximately 95% transmission pellicle mirror 101, an image on focal plane 32, when mirror 33 is moved into its uppermost position shown in dotted lines at 34 in FIG. 33. The arrangement of the optical parts consisting of the set of prisms 23 and 24, telephoto lenses 30 and 30′, and 45-degree mirror 31 is such that when the set of prisms is adjusted for the computed altitude and the whole device levelled as for a sextant by level 35 and directed in the azimuthal direction of the celestial body, the image of the celestial body will appear at the center 6" in the focal plane 32, when the altitude setting in accordance with 28 and 29 for the prisms 23 and 24 is identical with the observed altitude. If the observed altitude of the star is greater than the altitude setting for the prisms 23 and 24 the image of the star will appear on the focal plane 32 below the point 6"; and if, on the other hand, the observed altitude is less than the altitude setting the image of the celestial body will appear on the focal plane 32 above the central point 6". The scale of the image of the field containing the celestial body is such that when the image of the celestial body is on the image of the azimuth circle, introduced into the composite image described below, the observed altitude is 60 minutes different from the computed altitude based on the assumed position, and when this computed altitude is identical with the observed altitude the image of the celestial body will appear at the center of this image of the azimuth circle.

Housing 37 carries at the top portion thereof the arrangement for providing the optical source of the image of the azimuth circle, latitude and longitude lines, azimuth line, and line of position. These are provided by four different parts, one carrying the source of the azimuth circle with central longitude lines passing through its center and the three latitude lines, another part carrying the source of the two longitude lines adjustable in accordance with the latitude of the assumed position, a third part carrying the source of the azimuth line, and a fourth movable part carrying the source of the line of position.

At the top of housing 37 is circular element or azimuth wheel 39 having a graduated circle 52 graduated in degrees of azimuth rotatable in a horizontal plane within circular opening 40 in the top of housing 37. Rotatable element 39 has a circular opening 40' at the bottom of which is an exposed photographic plate 41 having exposed on the bottom surface thereof the azimuth circle 5' graduated in degrees, the central longitude line 7' passing through the center 6' of the circle and the zero-degree marking and 180° marking of the azimuth circle and the three latitude lines 8', 9' and 10'. This is shown in FIG. 12. It will be understood that the plate 41 carries on the bottom surface thereof a negative photographic image of these features as seen in FIG. 4 so that light passing through will produce an illuminated source thereof and plate 41 is illuminated from above by light 42 preferably assisted by white diffusion reflection screens 43 on the inside walls of housing 37. Light coming from plate 41 passes downwardly through 45° mirror 100 (a 50% coated mirror having about equal transmission and reflection) and through projection lens 44 to provide, by way of 45° mirror 101, an image on focal plane 32 such that the center of the azimuth circle appears at the center point 6" of the focal plane 32. The radius of the azimuth circle 5' on the plate 41 is such that in combination with lens 44 and the prisms 23 and 24 and lenses 30 and 30', the radius of the image of the azimuth circle on the focal plane 32 corresponds with 60 minutes (or 60 nautical miles) difference between observed and set altitudes such that the position of the image of the celestial body 13" on the focal plane 32 from the image 6" of the center of the circle 5" will give the difference between the assumed position and the actual position in minutes or nautical miles.

Figure 2:
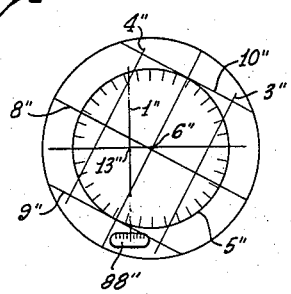
FIGURE 2 shows a typical composite image of the elements of the chart, omitting some details of the chart, and plot shown in FIG. 1 as obtained on a photographic negative in accordance with the device of my invention.
Figure 5:
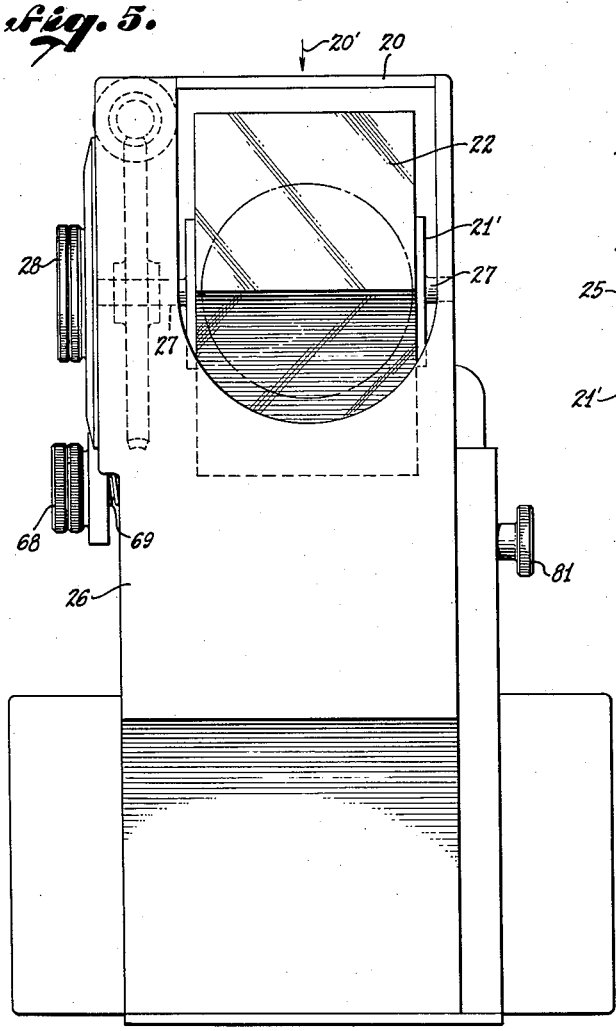
FIGURE 5 illustrates a front view of the device.

Carried by and below rotatable circular member 39 is an arrangement for setting wires 3' and 4' which are the sources for the images of longitude lines 3" and 4" as shown in FIG. 2 in accordance with the latitude of the assumed position. It will be understood, of course, that this is necessary because the difference in distance between longitude lines varies with latitude from the equator to the poles with the greatest distance between longitude lines at the equator and zero distance at the poles.

Carried directly below rotatable circular element or azimuth wheel 39 is circular housing 45, affixed to wheel 39 as by screws 46. Within housing 45 are two solid elements 47 and 48, each having semi-circular cutouts 49 and 50 within which are fluorescent wires 3' and 4'. Elements 47 and 48 are adapted to be moved perpendicular to fluorescent wires 3' and 4' along guide members 53 and 54 extending across circular housing 45 as particularly shown in FIG. 10 and FIG. 12, and also extending through holes 55 and 56 in element 47 and holes 57 and 58 in element 48. Wires 3' and 4' are fixed to the upper part of elements 47 and 48 to fit closely beneath photographic plate 41 to provide sources for the longitude lines 3" and 4" in the composite image shown in FIG. 2. The diameter of the semi-circles 49 and 50 as here shown is a little larger than the diameter of the azimuth circle 5' on plate 41.

Wires 3' and 4' can be adjusted by moving elements 47 and 48 along guides 53 and 54 uniformly from the central position to the maximum separation corresponding to the diameter of the azimuth circle on plate 41. When the two wires 3' and 4' are brought together in the central position, they are substantially coincident and pass through the center of this azimuth circle. This would correspond to a latitude of 90° at the poles. When these wires are uniformly separated the maximum distance, they correspond to the longitude lines at the zero latitude, that is, at the equator. Uniformly separated at any distance therebetween they can be set to provide images of longitude lines 3" and 4" for any latitude between zero and 90°.

This setting is accomplished by providing movable elements 47 and 48 with elements 59 and 60, respecitvely, carrying vertical grooves 61 and 62, respectively.

Adapted to be fit into grooves 61 and 62 are two pins 63 and 64. These are carried on element 65 affixed to the end of shaft 66 extending through casing 37, and rotatably held in position by bearing 67. By means of knob 68, normally held outward by spring 69, shaft 66 and pins 63 and 64 may be pushed into grooves 62 and 61, respectively, and with a turning of knob 68 through 90° elements 47 and 48 and wires 3' and 4' carried thereby may be moved from the position corresponding to zero latitude or 90° latitude, or any latitude position therebetween. With this arrangement the wires 3' and 4' may be adjusted by knob 68 to correspond to any latiture. Knob 68 conveniently carries a scale 70, as seen in FIG. 9, so that the knob may be set in accordance with the latitude in degrees from 0 to 90°. It will be understood that housing 45 and elements 47 and 48 therewithin carrying longitude wires 4' and 3', respectively, is adapted to rotate in a horizontal plane along with azimuth wheel 39 carrying plate 41, and that, therefore, in accordance with the arrangement here shown the adjustment of the position of longitude wires 3' and 4' can be bade only when azimuth wheel 39 is in the position so that pins 63 and 64 can engage grooves 61 and 62, which as here shown is when the zero-degree marking on the azimuth wheel 39 is as shown in FIG. 8.

Supported just below and closely adjacent to wires 3' and 4' is another fluorescent wire 2'. This wire is supported to extend lengthwise from front to back of the device (perpendicular to the plane of axis of rotation of the prisms 23 and 24 and center line of lenses 30 and 30') and through the center of the azimuth circle close to and just below plate 41. It extends across the azimuth circle to provide in the composite image the azimuth line as shown at 2" in FIG. 2. This wire is supported by means of horizontal posts 72 and 73 extending from and affixed to the inside of casing 37, carrying at their ends vertical posts 74 and 75.

Fluorescent wires 3', 4' and 2' are illuminated by ultraviolet lamp 51. It will be understood that ultraviolet lamp 51 causes wires 3', 4' and 2' to glow providing optical sources so that they will appear in the composite image against the dark background of photographic plate 41, through which light is transmitted only in accordance with the negative photographic image of the azimuth circle, latitude lines, and central longitude line.

At 77 is a vertical negative photographic plate movable horizontally lengthwise from front to back of the device. This plate 77 is carried by supporting elements 78 and 79. Plate 77 is an exposed photographic negative carrying on the surface facing mirror 100 a vertical line 1' exposed thereon and adapted to transmit light only through the line shown at 1' on FIG. 12. Plate 77 may be horizontally moved and adjusted in its position by knob 81 which turns shaft 82, gears 83 and 84 and screw shaft 85 in nut 86 which is fixed to plate 77. Light transmitted through line 1' is, by way of 45-degree, 50% reflecting mirror 100 and lens 44 superimposed on focal plane 32 and introduced into the image of the elements from plate 41, namely, longitude lines 3" and 4", and azimuth line 2". This provides the line of position 1" of FIG. 2, such as line 1 shown in FIG. 1. Plate 77 and line 1' are so arranged that the image 1" of line 1' in the composite image is perpendicular to the image 2" of azimuth wire 2', and plate 77 is adjustable so that the image 1" of line 1' may be moved lengthwise of the azimuth line 2", and perpendicular thereto across the full diameter of image 5" of the azimuth circle. Knob 81 may be graduated in minutes of a degree so that displacement of line 1' and its image 1" in the composite from the image center 6" of the azimuth circle and any point, such as 13", within the composite image may be read directly in minutes. Plate 77 and line 1' will also be illuminated by light 42, assisted by white diffusion reflection surfaces 43 within housing 38.

Located within the upwardly extending portion of element 79 is bubble level 88 extending lengthwise from front to back of the device, located in such a position that it too will be illuminated by light from lamp 42, passing through the glass bubble level, and an image of it will appear in the composite image by way of mirror 100 and lens 44. This will give an indication of the level so that correction can be made for any deviation as disclosed, for example, in my prior Patent No. 1,653,585.

It will be understood, of course, that bubble 88 and plate 77 will have the proper relationship with respect to mirror 100 so that the images 1" and 88" will appear in the local plane 32, along with the images from plate 41, wires 3' and 4', and wire 2'.

Within housing 89 there may be a photographic plate, which may be a negative or positive, located coincident with focal plane 32, having a focal plane shutter as understood in the art by means of which the composite image appearing at focal plane 32 may be photographed. With mirror 33 adjusted to the 45° angle position as shown in full lines, the local plane and image may be moved to the position shown at 90, and this image may then be viewed with adjustable eye-piece 91 as understood in the art. In order to invert this image from side to side, a "K" prism such as shown at 92 may be included within the eye-piece for visual observation of the composite image at focal plane 90.

In the operation of my device the negative plate 41 carrying the azimuth circle, latitude lines and longitude line and the negative plate 77 carrying the line 1' are illuminated by lamp 42 to provide the illuminated optical sources of graduated azimuth circle 5', center thereof 6', central longitude line 7' and latitude lines 8', 9' and 10', and line of position 1'.

Light from these sources in plate 41 passes through 50% transmitting mirror 100 and light from line 1' is reflected by 50% reflecting mirror 100 to superimpose movable line 1' within the image from the sources in plate 41. This composite image is projected by lens 44 onto mirror 101 and thus to provide a composite image in focal plane 32. It will be understood that line 1' and the sources in plate 41 are substantially equidistant from mirror 100 so that the images of all of these sources will appear in the focal plane 32.

Fluorescent wire 2', supplying the source of the image 2" of the azimuth line, and fluorescent wires 3' and 4', supplying the sources respectively for the images 3" and 4", are illuminated by ultraviolet lamp 51. Thus these three fluorescent wires 2', 3' and 4' are sources of light substantially in the same plane as plate 41, and light from these sources 2', 3' and 4' (as with light from source 5' and other sources in plate 41) passes through mirror 100, lens 44, and is reflected by mirror 101 to join the composite image at focal plane 32, providing the images, respectively, 2", 3" and 4".

Light from the celestial body upon which observation is made passes through double-Dove prisms 23 and 24, lenses 30 and 30', is reflected by mirror 31 through 90 to 95% light-transmitting and 5 to 10% reflecting pellicle or interference type mirror 101 so that the image of the celestial body also appears in the focal plane 32. Since the light from the celestial body such as a star may be relatively low in intensity compared to the intensity of light available from sources 1', 2', 3', 4' and 5', it is preferable that mirror 101 have a high light transmission and a low reflection.

It will be understood that to provide the image at the focal plane 32, mirror 33 will be in the uppermost position as shown in dotted lines at 34 in FIG. 3.

In operation of the device of my invention, wires 3' and 4' will first be set to correspond to the latitude of the assumed position by pressing knob 68 against spring 69 to move shaft 66 through bearing 67 and thus move element 65 so that pins 63 and 64 fit into grooves 62 and 61, respectively, turning knob 68 so that scale 70 is set at the degree marking of the assumed latitude. Knob 68 is then released from compressing spring 69, thus wires 3' and 4' are set to represent longitude lines 3" and 4", respectively, in FIG. 2 at this latitude.

Azimuth wheel 39 will then be turned so that the scale setting on scale 52, as shown in FIG. 8, will coincide with marker 76 at the degree marking for the azimuth direction. The rotation of azimuth wheel 39 to this scale setting rotates plate 41 so that wire 2' just underneath plate 41 passes through the center 6' of azimuth circle 5' and through this degree marking thereof. Lines 3' and 4' rotate with azimuth wheel 39 and plate 41 and retain their parallel relationship with central longitude line 7' on plate 41. There is thus obtained the adjustment so that the azimuth line 2' indicates the azimuth direction with respect to the azimuth circle 5' and other sources on plate 41 and wires 3' and 4'.

The double-Dove prisms 23 and 24 are adjusted to a setting of the nearest degree of altitude by coarse-setting knob 28, and to a fine setting of minutes by means of fine-setting knob 29 working through a micrometer tangent screw as understood in the art.

With this setting of azimuth wheel 39 and wires 3' and 4' and this altitude setting for the double-Dove prisms, the whole device is then levelled and directed toward the star in the manner of a sextant so that the image of this star appears at 13" in the composite image 90, with mirror 33 in the full-line position shown in FIGS. 3 and 12. This composite optical image at 90 is then viewed by means of eye-piece 91 through K-prism 92. The image seen to the eye is the negative of the image shown in FIG. 2, but before the adjustment of the image 1" of the line of position to pass through image 13" of the star. The line 1" is then made to coincide with 13" by turning knob 81 and thus moving plate 77 horizontally until the image 1" of the line source 1' coincides with the image 13" of this star. Line 1" is accordingly the line of position. This composite image may then be photographed by moving mirror 33 to the dotted line position shown at 34 and placing a photographic sensitive plate or film, such as a negative, at the focal plane 32, and exposing to expose this composite image to make a photograph thereof. On development, this image on a photographic negative will appear as shown in FIG. 2. Moreover, an arrangement may be provided, if desired, so that a button may be pushed which will start a mechanism into motion (similar to the mechanism in the well-known Graflex camera) which will cause mirror 33 to move up and trip the shutter causing the composite image seen in the eye-piece to be exposed photographically at the focal plane 32 and thus to be made into a permanent photographic record.

It will be understood that, although in the drawing the modifications of the invention including fluorescent wire 2' providing the source for the image of the azimuth line, fluorescent wires 3' and 4' providing the sources for the images of the adjustable longitude lines, and line 1' providing the adjustable source for the image of the line of position have been shown, the basic form of the invention for providing the composite image of the basic reference markings for an assumed position together with the image of the celestial body will omit all the elements on FIG. 1 between plate 41 and lens 44.

When to this basic form of the invention it is desired to have the azimuth line, wire 2' will be used in addition to the required elements for the basic form of the invention. This thus provides a modification of the invention with the source 2' for the image of the azimuth line added.

In accordance with still another modification of the invention, the adjustable sources 3' and 4' for the additional longitude lines will be added either to the basic form of the invention or to the basic form with the source of the image of the azimuth line included.

A still further modification of the invention includes the addition of the adjustable source 1' of the line of position, which may be added to the basic form of the invention only, or to the basic invention with either the source 2' of the azimuth line or the sources 3' and 4' of the additional longitude lines, or both.

The specific embodiments given above are for the purpose of illustrating my invention, and it will be understood that my invention includes other modifications within the scope of the following claims.

I claim:

1. An optical navigational device, useful in celestial navigation, for producing a composite optical image of an assumed position and an optical image of a celestial body upon which observation is made comprising means forming a first optical path, means for forming an optical image of the basic reference markings for an assumed position and introducing said optical image into said first optical path, means forming a second optical path, means adjustably positioned in accordance with the altitude of a selected celestial body with respect to the assumed position to introduce into said second optical path an optical image of said celestial body corresponding to its observed position, means forming a third optical path common to said first and second optical paths and means coupling said first and second optical paths to said common optical path so that the optical images traveling in said first and said second optical paths are united to produce a composite image of said celestial body and said basic reference markings for an assumed position.

2. An optical navigational device, useful in celestial navigation, for producing a composite optical image of the basic reference markings for an assumed position and an optical image of the celestial body upon which observation is made, comprising means forming a first optical path, means for forming an optical image of the basic reference markings for an assumed position and introducing said optical image into said first optical path, including a graduated azimuth circle rotatable about an axis passing through a point representing said assumed position, means forming a second optical path, means adjustably positioned in accordance with the altitude of a selected celestial body with respect to the assumed position to introduce into said second optical path an optical image of said selected celestial body corresponding to its observed position, means forming a third optical path common to said first and said second optical paths and means coupling said first and said second optical paths to said common optical path so that the optical images traveling in said first and said second optical paths are united to produce a composite image of said celestial body and said basic reference markings for an assumed position.

3. An optical navigational device, useful in celestial navigation, for producing a composite optical image of the basic reference markings for an assumed position and an optical image of a celestial body upon which observation is made, comprising means forming a first optical path, means for forming an optical image of the basic reference markings for an assumed position and introducing said optical image into said first optical path, including a part carrying a graduated azimuth circle having a center point representing the assumed position, another part carrying a line representing the azimuth line, said first and said second parts being movable relative to each other to vary the azimuthal direction of said azimuth line with respect to said azimuth circle, means forming a second optical path, means adjustably positioned in accordance with the altitude of a selected celestial body with respect to the assumed position to introduce into said second optical path an optical image of said celestial body corresponding to its observed position, means forming a third optical path common to said first and said second optical paths and means coupling said first and said second optical paths to said common optical path so that the optical images traveling in said first and said second optical paths are united to produce a composite image of said celestial body and said basic reference markings for an assumed position.

4. An optical navigational device as defined in claim 3 including a further part carrying a line representing a line of the position, perpendicular to the azimuth line and adjustable to coincide with the image of said celestial body.

5. An optical navigational device useful in celestial navigation, for producing a composite optical image the basic reference marking for an assumed position and an optical image of the celestial body upon which observation is made, comprising means forming a first optical path, means for forming an optical image of the basic reference markings for an assumed position and introducing said optical image into said first optical path including a first part carrying a graduated azimuth circle having a central longitude line passing through its center and corresponding latitude lines, a second part carrying two longitude lines adjustable in accordance with the latitude of the assumed position, a third part carrying a source of the azimuth line and a fourth movable part carrying the line of position, said first and said third parts being adjustable relative to each other to vary the azimuth position of said azimuth line with respect to said graduated circle, said fourth part being movable relative to said third part to move said line of position along said azimuth line to coincide with a celestial body in the composite image, means forming a second optical path, means adjustably positioned in accordance with the altitude of a selected celestial body with respect to the assumed position to introduce into said second optical path an optical image of said selected celestial body corresponding to its observed position, means forming a third optical path common to said first and said second optical paths, means coupling said first and said second optical paths to said common optical path so that the optical images traveling in said first and said second optical paths are united to produce a composite image of said celestial body and said basic referenced markings for an assumed position.

References Cited in the file of this patent

UNITED STATES PATENTS

| | | |
|---|---|---|
| 886,722 | Neumayer | May 5, 1908 |
| 1,160,184 | Mackensen | Nov. 16, 1915 |
| 1,653,585 | Pierce | Dec. 20, 1927 |
| 1,877,459 | Hayes | Sept. 13, 1932 |
| 2,064,062 | Hagner | Dec. 15, 1936 |
| 2,232,518 | Everitt | Feb. 18, 1941 |
| 2,239,539 | Schmidt et al. | Apr. 22, 1941 |
| 2,410,667 | Luboshez | Nov. 5, 1946 |
| 2,505,819 | Wrigley | May 2, 1950 |
| 2,566,312 | Cable | Sept. 4, 1951 |
| 2,579,903 | Carbonara | Dec. 25, 1951 |
| 2,616,177 | Bazhaw | Nov. 4, 1952 |

FOREIGN PATENTS

| | | |
|---|---|---|
| 610,561 | Great Britain | Oct. 18, 1948 |